US008795045B2

(12) United States Patent
Sorrells et al.

(10) Patent No.: US 8,795,045 B2
(45) Date of Patent: Aug. 5, 2014

(54) "OLD SCHOOL" FANTASY SPORTS SYSTEM AND METHOD

(75) Inventors: Eric M Sorrells, Atlanta, GA (US); Jared A Davis, Atlanta, GA (US)

(73) Assignee: Four O'Clock Fantasy Sports Concepts LLC, Atlanta, GA (US)

(*) Notice: Subject to any disclaimer, the term of this patent is extended or adjusted under 35 U.S.C. 154(b) by 1420 days.

(21) Appl. No.: 12/107,814

(22) Filed: Apr. 23, 2008

(65) Prior Publication Data
US 2009/0270172 A1 Oct. 29, 2009

(51) Int. Cl.
*A63F 13/46* (2014.01)
*A63F 13/816* (2014.01)

(52) U.S. Cl.
USPC .................................. 463/4; 463/42

(58) Field of Classification Search
CPC ....... A63F 13/005; A63F 13/10; A63F 13/12; A63F 2300/61; A63F 2300/65; A63F 2300/69; A63F 2300/8005; A63F 2300/8011
USPC ............................. 463/1, 4, 42, 43
See application file for complete search history.

(56) References Cited

U.S. PATENT DOCUMENTS

| | | | |
|---|---|---|---|
| 4,918,603 A | | 4/1990 | Hughes et al. |
| 5,018,736 A | | 5/1991 | Pearson et al. |
| 5,263,723 A | * | 11/1993 | Pearson et al. .................. 463/41 |
| 5,713,793 A | | 2/1998 | Holte |
| 5,846,132 A | * | 12/1998 | Junkin ............................ 463/42 |
| 5,860,862 A | | 1/1999 | Junkin |
| 5,970,143 A | * | 10/1999 | Schneier et al. .............. 713/181 |
| 6,292,706 B1 | * | 9/2001 | Birch et al. ..................... 700/91 |
| 6,371,855 B1 | | 4/2002 | Gavriloff |
| 6,669,565 B2 | | 12/2003 | Liegey |
| 6,688,973 B2 | | 2/2004 | Satloff et al. |
| 6,688,978 B1 | | 2/2004 | Herman |
| 7,001,279 B1 | | 2/2006 | Barber et al. |
| 7,050,350 B2 | | 5/2006 | Kuroki |
| 8,202,149 B2 | * | 6/2012 | Gedling et al. .................. 463/4 |
| 2004/0204217 A1 | | 10/2004 | Herman |
| 2005/0064937 A1 | | 3/2005 | Ballman |
| 2006/0046807 A1 | | 3/2006 | Sanchez |
| 2006/0105827 A1 | * | 5/2006 | Metzger et al. .................. 463/9 |
| 2006/0252476 A1 | | 11/2006 | Bahou |
| 2007/0021853 A1 | | 1/2007 | Ma et al. |
| 2007/0072679 A1 | | 3/2007 | Kerns et al. |
| 2007/0233585 A1 | | 10/2007 | Ben Simon et al. |
| 2008/0281444 A1 | * | 11/2008 | Krieger et al. .................. 700/91 |
| 2011/0028195 A1 | * | 2/2011 | Pennington et al. ............. 463/2 |
| 2013/0045805 A1 | * | 2/2013 | Pennington et al. ........... 463/42 |

OTHER PUBLICATIONS

Steven Smith, Fantistics Baseball Customer Testimonials (2006) (available at: http://www.insiderbaseball.com/2006Testimonials.htm).*

* cited by examiner

*Primary Examiner* — Bach Hoang
(74) *Attorney, Agent, or Firm* — Smith Risley Tempel Santos LLC; Matthew T. Hoots

(57) ABSTRACT

The realm of fantasy sports gaming is expanded beyond the selection of current, active athletes by including former athletes, or former seasons for current athletes, in a selection pool for fantasy sports leagues. This is accomplished by querying databases of sports statistics for the purpose of generating a mock performance that can be fairly compared and incorporated with real-time performances generated by current athletes actively participating in the same sport. The end result is a realistic, yet unpredictable, statistical box score for a former athlete that can be translated via a point system for the purpose of fantasy sports league play.

9 Claims, 4 Drawing Sheets

"OLD SCHOOL" FANTASY SPORTS SYSTEM AND METHOD

FIELD OF THE INVENTION

The present invention relates to fantasy sports gaming and, more specifically, to the methodology required to incorporate into a single fantasy game the statistics generated from the performances of former athletes with statistics yet to be generated by current athletes.

BACKGROUND OF THE INVENTION

Fantasy sports leagues represent a rapidly growing sports-related gaming industry. The attraction is that statistics taken from the performance of selected athletes enable friends, colleagues, and strangers to pit their sports knowledge against one another with the victor ultimately being determined by the real play of the athletes. The purpose of fantasy leagues is not to create some simulation in a futile effort to determine whether the 1972 Dolphins could beat the 1985 Bears. Rather, the draw to fantasy leagues is the desire to test one's skill at recognizing and predicting athletic talent, game-day mismatches, and breakout performances. In short, the draw is to be a virtual general manager of a sports team.

The origin of fantasy sports leagues is largely considered the brainchild of Wilfred "Bill" Winkenbach. Evidently, sometime in the early 1960s, Winkenbach, a partner in the American Football League (AFL) franchise known as the Oakland Raiders, hatched the concept while lodging at the Milford Plaza Hotel in Manhattan, N.Y. Participating in Winkenbach's original "league" were mostly other AFL executive types along with a few local area sportswriters and Raiders season ticket holders. Winkenbach's league was later dubbed by its members as The Greater Oakland Professional Pigskin Prognosticators League (GOPPPL) and featured a format that has come to be known as "head to head."

Much like modern day fantasy leagues, GOPPPL "franchise owners" held a mock draft and selected a number of "skill position" players who were active on various AFL squads. The "drafted" players represented the teams that would be managed over the course of the season by the respective franchise owners. Each week, the franchise owners would submit their mock rosters of "starters" prior to the weekend games and then proceed to root for their players without regard for the actual teams on which the players played. The statistical performances of the players translated into points for the GOPPPL franchise owners via a predetermined point system (so many points for a touchdown, so many for a reception, etc.). At the end of the games, the commissioner of the league (not surprisingly, it was Winkenbach) began the tedious process of compiling the statistics and tallying the corresponding points. The "head-to-head" winner of each week's match-ups between pairs of teams was declared based on the totals of these points. Ultimately, the franchise owner whose team had the best record at the end of the football season was the league champion.

From there, the phenomenon grew. Winkenbach's concept caught on, and variations of it spread to other sports. In the early 1980s, baseball fantasy leagues spawned the "rotisserie" format. In a fantasy league with a rotisserie format, the franchise owners participating in the league do not engage in "head-to-head" match-ups with a "win" or "loss" being assigned to their record after a contest. Rather, in a rotisserie format, the statistics for the designated players are totaled over the course of the season with points usually being assigned based on a player's actual statistical standings during the season. For instance, a specified number of points may be awarded if a franchise owner's player ranked first in slugging percentage. Alternatively, points in a rotisserie format may be awarded based on a pitcher's actual earned run average (ERA) instead of where that pitcher ranks against his peers for the ERA statistic. Yet another variation on the rotisserie format may award points based on a player's rank for a given statistic only as it relates to the same statistic for other players in the fantasy league.

Regardless, the winner of a rotisserie-style fantasy league is ultimately determined by the totality of points his team amasses by the end of the season. Because of the sheer number of games in a baseball season, along with the varying numbers of games played in a given week, the rotisserie format is well suited for fantasy baseball league participants as it minimizes the time commitment of participating. In short, at the end of the season the points are totaled, and a winner crowned.

While "head-to-head" and "rotisserie" fantasy league formats are the most common, other formats have developed as fantasy sports have gained in popularity. For instance, "Pick 'Em" leagues don't require the drafting of a fantasy team. Rather, a "Pick 'Em" league participant has to pick only winners of actual games in head-to-head match-ups of real sports teams over the course of a season. Wins and losses are scored according to the league rules and may even be weighted according to a participant's "confidence level" when he predicted a winner.

Yet another popular format is known as a "Salary Cap" league. A "Salary Cap" league arms its franchise owners with virtual bank accounts and assigns players in the selection pool a virtual monetary value. The goal is to draft and manage the most statistically prolific fantasy team possible while staying within the virtual budget. Scoring for "Salary Cap" leagues may follow a head-to-head, rotisserie, or other format. Regardless of the scoring formula, the real challenge in a "Salary Cap" fantasy league is to work within the budget.

When Winkenbach's league started in the 1960s, all statistical analysis and scoring had to be done manually. League management, therefore, was a tedious task best left to the most dedicated and detail-oriented sports fanatic in the league (usually the "commissioner"). Leagues heavily relied on periodicals, actual game-day accounts, radio and television broadcasts, and other means of gathering data in order to assign scores to the fantasy teams. Because the scoring process was so mentally daunting and time consuming, only the most serious sports fans ever joined a league. Further, the depth of statistics and complexity of a scoring system were necessarily limited in deference to practicality. All of the factors that kept fantasy sports an experience for only the most dedicated fan evaporated with the advent of the Internet.

By the late 1990s, the Internet had become largely available to the masses, and fantasy sports blossomed accordingly. With computers to access game day statistics, facilitate research on players, automate drafts, manage and post team rosters, calculate scores, and provide remote access for league participants, the fantasy sports experience became realistically available to even the most casual fan. Because of the Internet, the need for manual data compilation no longer existed. Fantasy sports games encompassing every major sport, variation of format, and scoring twist evolved practically overnight and continue to spawn now, a decade later.

Even with the almost countless variations of fantasy sports leagues available today, however, there is at least one common denominator among them all. The common factor in all fantasy sports leagues to date, regardless of sport, level of sport, format, or scoring system, is that only current, active athletes in the selected sport are eligible to be "drafted" by fantasy league owners. Consequently, only the statistics that will be generated by current, active players in a game yet to be played can be translated into points for a fantasy team owner or league participant. Therefore, what is needed in the art is a system and method to integrate statistics already generated by the performances of former athletes with statistics yet to be generated by current, active athletes.

SUMMARY OF THE INVENTION

Various embodiments, aspects and features of the present invention encompass a system and/or a method employed to create a fantasy sports game format that equitably incorporates former athletes and current, active athletes into a single game. One aspect of exemplary embodiments of the invention makes physically possible the necessary querying, and subsequent integration, of statistics generated by athletic performances of former athletes. Another aspect of exemplary embodiments of the present invention includes logical algorithms for the random selection of the existing statistics historically generated by former athletes. Ultimately, the randomly selected statistics of former athletes can be interpreted to simulate the real-life performances of current, active athletes that have also been chosen for fantasy play.

One embodiment of the present invention includes a system that is accessible over a network by participants in a fantasy league game. The system administers the fantasy league game in such a manner to incorporate statistics of selected former athletes into a fantasy league event. The system includes a database that among other things includes statistics that identify the number of games played by one or more former athletes, the number of plays in each such game in which the former athletes participated and statistical results of each said play. In one embodiment, the statistics are split into two distinct databases with the first database used to identify the number of plays for each former athlete per game and the second database used to identify the specific plays of which each former player was a part in each game. In addition, the second database archives for each play a variety of statistics regarding a former athlete's performance during a given play.

The system includes a user interface over which the fantasy league participants can identify athletes for the fantasy league event, monitor results and standings, and otherwise provide information to the system. The system also includes an administrator module that administers the fantasy league game. Administration of the fantasy league game includes accessing the database to select a set of historical statistical information based at least in part on the statistical performance of the selected former athlete. For instance, the administrator module may operate to identify a participation value for a selected former athlete. The participation value identifies the number of plays in which the selected former athlete will participate for the fantasy league event. Next, the administrator module accesses the database to select statistics for the number of plays identified by the participation value.

In a more specific embodiment, the administrator module may select a random game in which the former athlete played. In the randomly selected game, the number of plays in which the former athlete participated is identified. This number is the participation value in this embodiment and represents the number of plays in which the former athlete will participate for the current fantasy league event. In some embodiments the participation value can be determined in other manners, such as a randomly generated number or by a hybrid of the number of plays in a randomly selected game and other parameters.

Next, the database is queried to access a random play in which the former athlete participated. The statistics pertaining to that randomly selected play are then applied in the fantasy league event to determine the number of points, if any, attributed to the fantasy league player. Thus, the administrator module incorporates the selected set of statistical information into the fantasy league event.

In some embodiments, the database contains statistics substantially covering the careers of the former athletes. In other embodiments it may only include a subset of those games. In some embodiments, independent from the participation value of the former athlete, the administrator module accesses the database to select a set of historical statistical information by randomly selecting plays in which the selected former athlete participated. In other embodiments, the administrator module accesses the database to select a set of historical statistical information by randomly selecting plays in which the selected former athlete participated from a pool of plays substantially covering the career of the selected former athlete. In yet another embodiment, the administrator module accesses the database to select a set of historical statistical information by randomly selecting plays from a pool of plays of the selected former athlete that have environmental similarities to the environment of the fantasy league event. In other embodiments, the administrator module accesses the database to select a set of historical statistical information by randomly selecting plays in which the selected former athlete participated from a pool of games in which the selected former athlete appeared over a substantial portion of the selected former athletes career.

Finally, the system also includes a point system to rate the performance of fantasy players, whether former or active, and determine a fantasy league event winner.

DETAILED DESCRIPTION OF THE INVENTION

Figure 1:
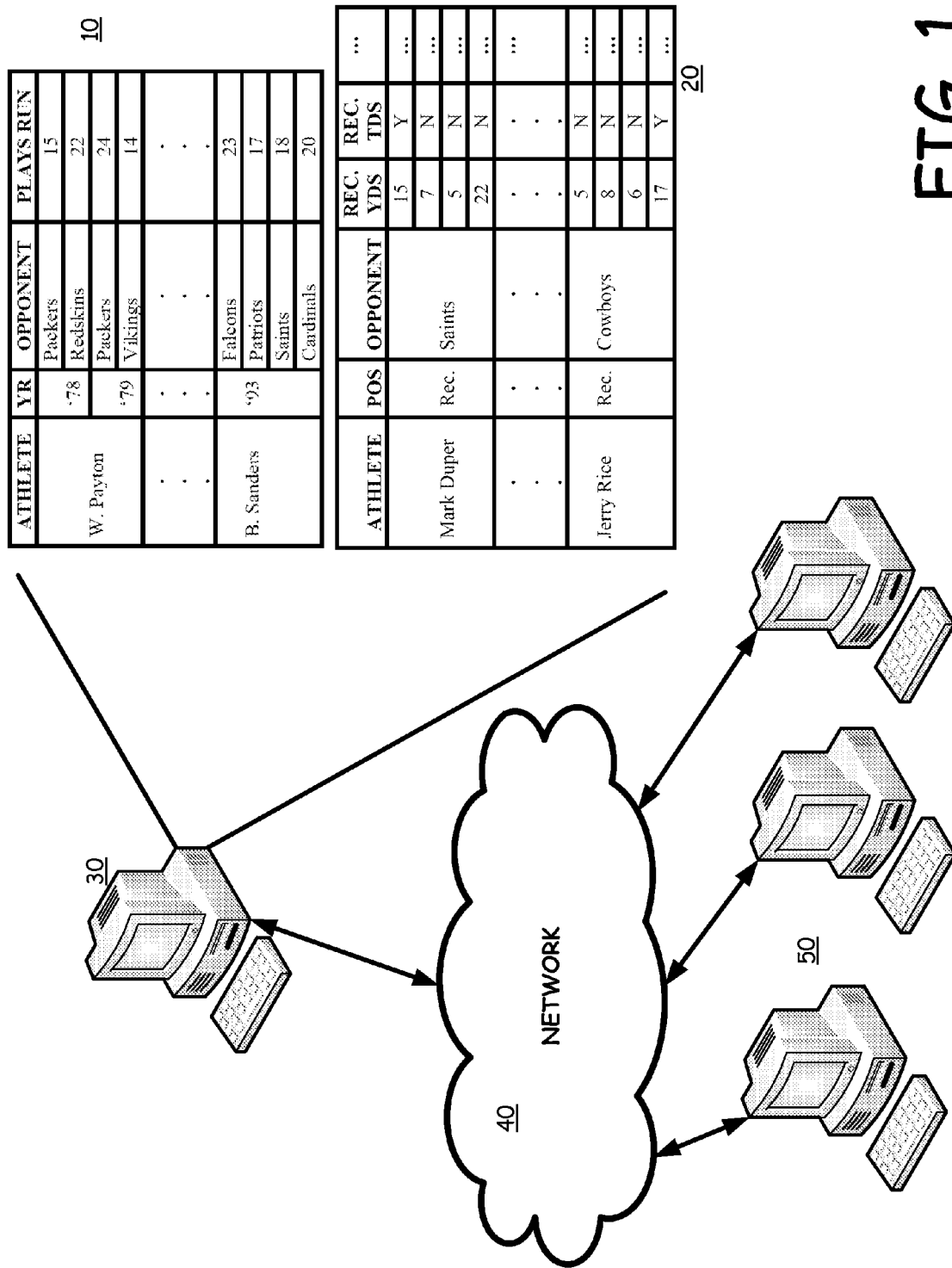
FIG. 1 depicts a system diagram providing a suitable environment for deploying various embodiments of the present invention.

Embodiments and aspects of the present invention provide a solution to the above-described needs in the art, as well as other needs and shortcomings by providing a system and method for integrating statistics generated by future athletic performances and past athletic performances into a single fantasy sports league game. Aspects of exemplary embodiments of the present invention relate to the random selection of statistics from a database, or databases, containing data generated by past athletic performances. Additional aspects include user-defined modifications to the selection algorithm for the purpose of setting a probability that randomly selected statistics will be queried from a subset of the given database.

More specifically, the random selection and algorithmic modification aspects of various embodiments of the present invention provide fantasy league participants with the option to mix former athletes, or even former seasons of active athletes, with current athletes on a fantasy roster without sacrificing the inherent unpredictability factor of sports that makes fantasy sports league play so compelling.

Traditionally, fantasy sports league participants were limited to the selection of current, active athletes to make up the "starting" roster. Once the starting rosters were set for all teams in a given fantasy league, the outcomes were solely determined by statistics yet to be generated. Only after the week's actual games were played, and the game day statistics of the selected athletes compiled, could the winning fantasy team be determined. To this end, fantasy sports leagues are not simulations. Just like a real general manager of a professional football team, for instance, the general manager of a fantasy team cannot predict the future performance of an athlete he has selected to be on his team. Ultimately, it is this unpredictability that makes the fantasy sports league experience so exciting to participants.

Advantageously, embodiments of the present invention operate to expand the eligible selection pool of athletes to include former athletes. This is accomplished without sacrificing the unpredictability factor by randomly incorporating known statistics at the time of roster selection into a fantasy sports game. As a non-limiting example, assume that a fantasy football "team owner" selects Walter "Sweetness" Payton, a former running back for the Chicago Bears during the late 1970s and 1980s, as his team's starting running back for the week. One embodiment of the invention could operate by accessing a database containing the number of plays Payton ran in each game over the course of his career. An algorithm can then randomly select a game during Payton's career and the number of plays he ran in that game. The number of plays in which Payton participated in the randomly selected game would correspond to the number of plays Payton would run for the purpose of the current week's fantasy game.

In an effort to reflect actual match-ups in the present day league, the aforementioned algorithm used for determining a former player's play quantity could be modified by the fantasy league commissioner to preset a percent likelihood, or probability factor, such that a game selected from Payton's career would be a game where the opponent Payton's Bears faced historically is the same opponent the present day Bears are scheduled to face. Further, it should be appreciated that such modifications to the selection algorithm are easily made by one skilled in the art and may enhance the game day experience for the user.

Once the number of plays that the former athlete will "run" on game day has been determined, a query can be performed on a second database that contains statistics on each individual play run over the course of the athlete's career. Linked to each play in the second database would be all statistics relevant to the position of the athlete associated with that play. As a non-limiting example, in addition to data such as team played for, opponent, date, location, etc., the second database may contain statistics for a running back such as rushing yardage, touchdowns, fumbles, passing yardage, and passing touchdowns. Likewise, statistics relevant to other positions for the given sport could also be documented in the database.

Additionally, manufactured statistics could be included in the database and made eligible for random selection where the inclusion of such statistics would augment the fantasy game experience. A non-limiting example of a scenario where manufactured statistics may be desirable is when a former athlete, such as Cal Ripken, had career long stretches where he never missed a game due to injury. In such a case, inclusion of a few injuries in the database representing Ripken's career statistics may make a fantasy game more unpredictable.

In the example of Walter Payton being selected by a fantasy league "team owner" as the starting running back, a second algorithm could be employed at this point to randomly select from the second database a quantity of plays equal in number to the quantity previously determined by the first step in the method. It should be noted that, similar to the algorithmic modification posited above, one skilled in the art could alter the random selection algorithm used for play selection in the second database to include a preset percent likelihood, or probability factor, such that a selected play would have a certain likelihood to have been run during a game in which Payton's Bears faced an opponent that is the same opponent the present day Bears are scheduled to face. Such modifications may enhance game day experience for the fantasy league participant. Further, the above described modification that is the preset percent likelihood aspect of exemplary embodiments could operate such that the probability factor is selected once by a user and then applied equally to any step in the method that queries from a statistical database. Alternatively, the same preset percent likelihood aspect could operate in other embodiments to allow a user to individually select a probability factor for each step in the method that queries from a statistical database such that the games or plays selected by the algorithm would have a percent likelihood of being associated with any desired condition including, but not limited to, rain, indoor or outdoor facilities, weather, turf, home or away game designation, etc.

In addition to the aspect of exemplary embodiments that allows a user to preset a percent likelihood that statistics queried from a database will be associated with a given condition, other modifications can be made to the query algorithm used to select statistics generated in past athletic performances such that queries are made from a predetermined subset of a statistical database. One such non-limiting example of an algorithm modification that users of the present invention may employ is the ability to limit a query to include only games or plays where the athlete's team was facing a specific opponent. Another non-limiting example of an algorithm modification may further limit a query to a specific time frame in the athlete's career. Yet another example may limit the query to plays where the player participated at a specific position. In addition, other factors may also be considered as selection criteria in the algorithm, such as the weather at the time of the selected play, the type of field (indoor, outdoor, natural turf, artificial turf, etc.), time of day (day game vs. night game), location of game (home field or specific field), score situation at which selected play was run (behind, ahead, particular quarter, amount of time remaining in game, down and yardage situation at which selected play was run, i.e. first and ten, fourth and inches, third and extra yardage, etc.). Regardless, it should be appreciated that various embodiments of the present invention may include a wide variety of algorithm modifications made to affect the query boundaries of the statistical databases and, although particular embodiments may be considered as novel, the present invention is not limited to any particular embodiment.

Furthermore, the present invention is not limited in the style of format or scoring formula that various embodiments may employ. Embodiments of the present invention can be incorporated into any fantasy sports league game format used in any imaginable sport, whether "head-to-head," "rotisserie," "salary cap," or some other format. In addition, various embodiments of the present invention can be used regardless of the scoring formula preferred by a given league's participants and/or the statistical categories tracked or points designated. Therefore, there exists a very wide range of applications for embodiments of the invention, as it pertains to fantasy sports league game play.

An exemplary embodiment of the present invention, as a whole, encompasses both the operation of integrating past statistics as previously explained, along with an overall system for collecting and storing statistical and operational information and administering the various aspects of the game. It should be appreciated that the statistical information could be derived from manual databases, chalkboards, and transistor radios, but most embodiments of the present invention make use of a computer network with the "Internet" as its bus. Such embodiments that employ the Internet may feature a web page aspect designed with the intent to relate information generated by the statistical queries of the algorithm. Advantageously, a web page aspect provides a convenient forum to display relevant game statistics and simulate real-time athletic contests.

An exemplary embodiment of a web page aspect may relay to users the specific game's content, point totalization, player likenesses, and even video of the randomly queried plays. More specifically, a web page aspect may display information regarding designated players, selected plays, relevant play results, and real-time data from other league match-ups. Further, a web page aspect could be standardized such that each user who is logged into the game sees the same content displayed in an identical format or, alternatively, could easily provide a means for individual users to customize the format according to personal preferences. Also, a web page aspect could be used to simulate a traditional fantasy league experience by alternating between offensive and defensive series while simultaneously unfolding at the rate of a real athletic contest and within a real game day time slot.

Referring now to the figures in which like numerals and labels represent like elements throughout the several views and the drawings, hereinafter FIGS. 1 through 4, represent exemplary embodiments, aspects and features of the present invention.

FIG. 1 depicts a system diagram providing a suitable environment for deploying various embodiments of the present invention. Embodiments of the Old School Fantasy Sports game can be hosted on a central server 30 via an Internet 40 accessible website. Remote participants 50, wishing to form a fantasy league, log onto the host server 30 and register, with a designated "commissioner" making all selections as to game format, algorithm construction, and scoring formulas. The remote participants, once registered are referred to as league participants. The league participants draft players, either active or former in status, and post their individual "starting" line-ups on the host server 30. For any "starters" selected by league participants that are former in status, the host server 30 accesses a database 10 containing the number of plays in which the former athlete participated in each game over the course of his career. An algorithm on the server 30 then randomly or pseudo-randomly selects a game from the career of the former athlete along with the number of plays in that game in which the former athlete generated statistics. It should be understood that throughout this description, the term random and randomly is used to encompass random, pseudo-random, arbitrary or other random appearing methods. The play total selected then corresponds to the number of plays that the former athlete will run for the purpose of the current week's fantasy game.

Once the number of plays earmarked for the former athlete has been determined, the host server 30 then accesses a second database 20 containing statistics on each individual play run over the course of the athlete's career. Linked to each play in the second database 20 is a set of statistics relevant to the position of the former athlete associated with that play. The host server 30 uses another algorithm to randomly select from the second database 20 a quantity of plays equal in number to the quantity previously determined from the query of the first database 10. From these randomly selected plays, the actual statistics are used in the league scoring formula to tally points for the team starting the former athlete.

It will be appreciated that the present invention can be embodied in several environments and placing the embodiment within the environment of a front-end website for tracking fantasy league performance is only one exemplary environment. It will also be appreciated that embodiments of the present invention can be presented to participants in a variety of manners. One such manner is to have the front-end website provide an interactive, real-time or near real-time game day experience.

Figure 2:
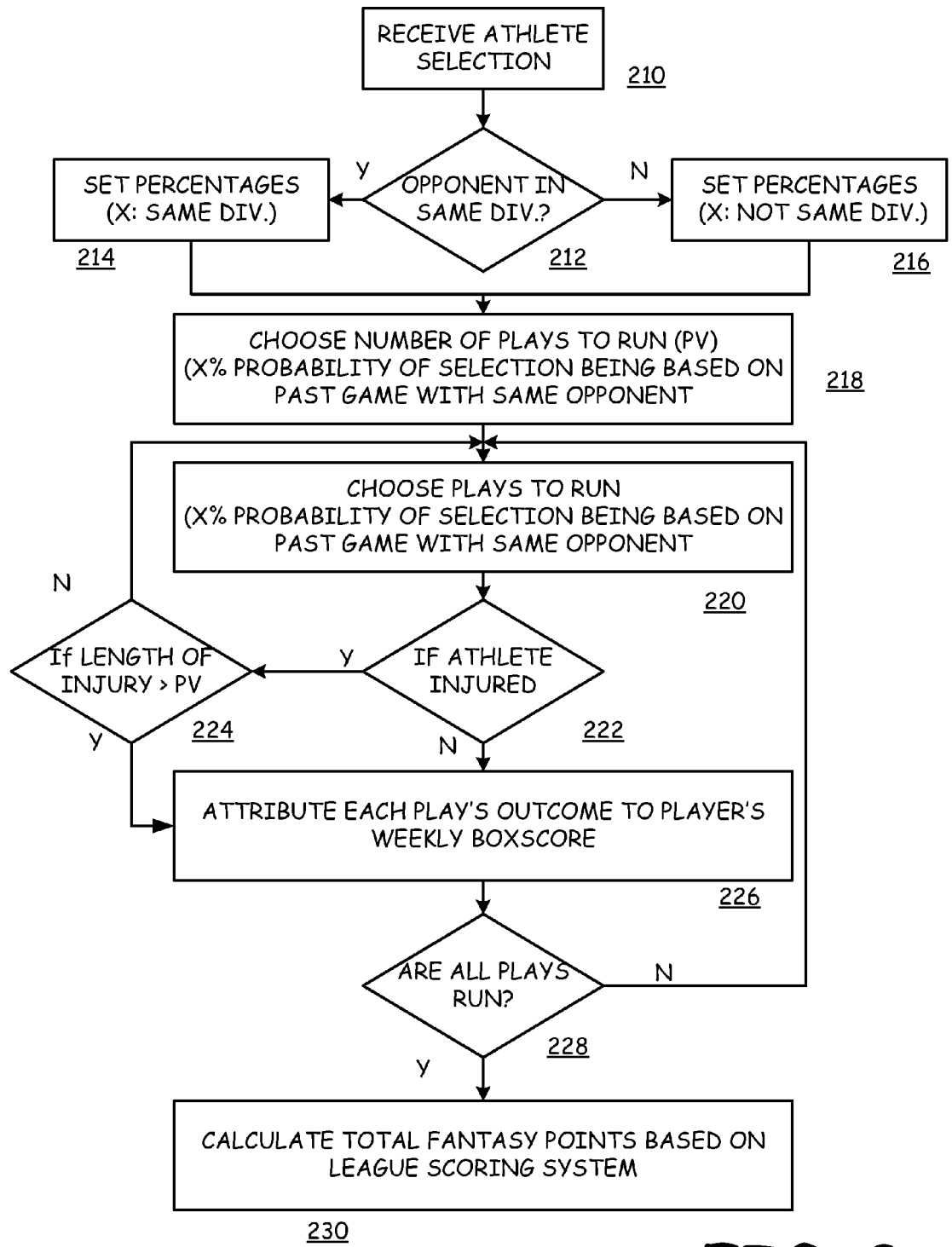
FIG. 2 is a flow diagram depicting a non-limiting example of a method in a fantasy football league for arriving at the specific plays that will be used to generate statistics for a given fantasy game on behalf of a former athlete.

FIG. 2 is a flow diagram depicting a non-limiting example of a method in a fantasy football league for arriving at the specific plays that will be used to generate statistics for a given fantasy game on behalf of a former athlete. Initially, a selection identifying a desired former athlete is received 210. The next step is to determine if the former athlete's team and the current weekly opponent to the former athlete's team are in the same division 212. The sequence of steps in the method is identical from this point forward whether the answer to the threshold question is "yes" or "no." Unrelated to the sequence, however, the outcome of the method will differ as the algorithm for the preferred method may have different predefined probability factors based on whether the opponent is, or is not, in the same division as the former athlete's team. Thus, if the opponent is in the same division 212, then a set of probabilities for the same division is selected 214. If the opponent is not in the same division, however, then another set of probabilities is selected 216. In either case, a variable X is used to identify the selected set of probabilities.

Regardless, once the threshold question is answered 212, the next step is to randomly select the number of plays that will be run in the fantasy game on behalf of the former athlete. In the illustrated embodiment, the number of plays corresponds to the number of plays the former athlete actually ran in a randomly selected game from his career or from a pool of selected games 218. The probability that the game selected featured a specific opponent, as well as other criteria, is predefined by the fantasy league commissioner and is represented as X percent.

Once the number of plays to be run is determined 218, the next step is to randomly select that number of plays from a database containing statistics associated with every play, or at least a substantial number of plays, that the former athlete ran over the course of his career 220. The fantasy league commissioner defines the probability that a randomly selected play will come from a game where the opponent is the same franchise as the current day opponent facing the former athlete's team, as well as other criteria. As each play is randomly selected 220 up to the predetermined total number, the play is evaluated and applied. If it is determined that the former athlete was injured in any one of the selected plays 222, then a delay or stop is performed 224. It should be appreciated that the response to an injury of the former athlete can vary from embodiment to embodiment. For instance, in a baseball embodiment, the identified injury may result in a player being placed on the DL for a period of time, missing a game, dropping out for the rest of the season or simply no more virtual plays being run on the former athlete's behalf for a time period equal to the time the former athlete was historically injured. If the play is not an injurious play, then statistical categories associated with that play are attributed to the former athlete's virtual box score 226. This process is repeated from step 220 until all of the plays have been selected 228. After all plays in the sequence have been randomly selected and run, the total statistics attributed to the box score 226 are converted to fantasy points via the league scoring system 230 and posted to the appropriate fantasy team.

It should be appreciated that, ideally, every game and every play over the course of an athlete's career will be utilized in the searchable database domain; this ideal scenario, however, of the present invention does not limit the application. In fact, in some embodiments of the game the use of "super athletes" may be used in which only a top percentage of the former athletes' best performances are utilized. In other embodiments, removing extreme plays may normalize performance. Also, it is anticipated that records for all the plays of a former athlete may not be available or accurate and, thus, only partial information or a subset of all the plays may be available. In addition, the pool of plays may be limited to only a select number of seasons, may or may not include an athlete's minor league play, rookie year, injured year, etc. All of these factors, although potentially considered as inventive aspects of the present invention, are non-limiting on the present invention.

Figure 3:
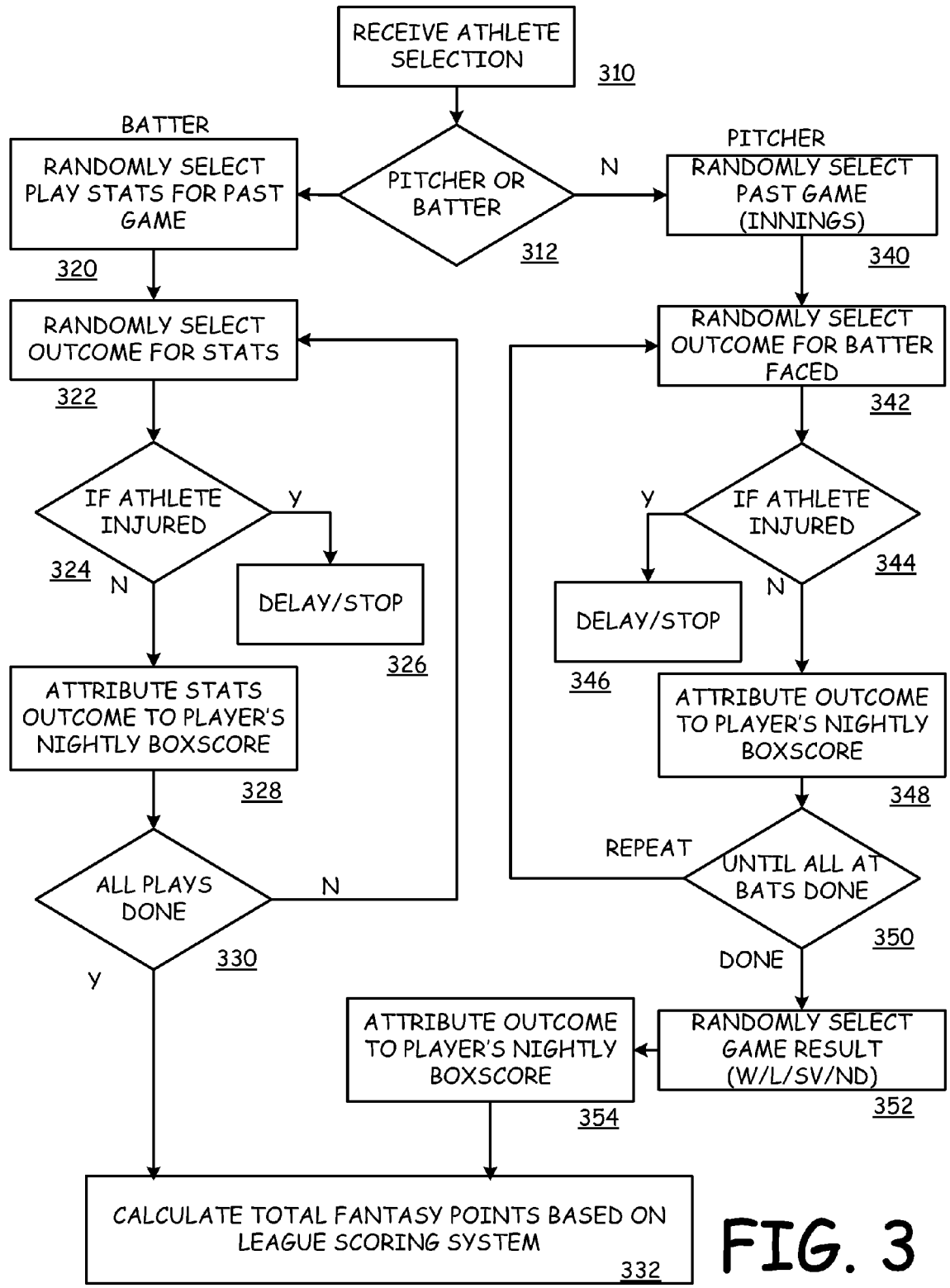
FIG. 3 is a flow diagram depicting a non-limiting example of a method in a fantasy baseball league for arriving at the specific plays that will be used to generate statistics for a given fantasy game on behalf of a former athlete.

FIG. 3 is a flow diagram depicting a non-limiting example of a method in a fantasy baseball league for arriving at the specific plays that will be used to generate statistics for a given fantasy game on behalf of a former athlete. Initially, the identity of a selected former athlete is received 310 and it is determined whether the former athlete is a pitcher or a batter 312. If the former athlete is a batter, the next step in the algorithm is to randomly select the number of offensive plays that will be taken in the fantasy game on behalf of the former athlete 320. The number of offensive plays to be run in the fantasy game session on behalf of the former athlete will correspond to the number of offensive plays in which the former athlete actually generated a statistic in a randomly selected game from his career. It should be noted that the term "offensive plays" includes both plays in which the batter generated statistics from an at bat as well as plays in which miscellaneous offensive statistics were generated such as runs scored or stolen bases. The total number of offensive plays, and its breakdown of type between at bats and non-at bats are queried from data associated with the randomly selected game 320. The probability that the game selected featured a specific opposing team or pitcher may be predefined by the fantasy league commissioner.

Once the number, and type, of offensive plays to be taken is determined 320, the next step is to randomly select the same number, and type, of offensive plays from a database containing statistics associated with every offensive play, or a substantial number of offensive plays, in which the former athlete generated statistics over the course of his career 322. The probability that a randomly selected offensive play will come from a game that featured a specific opposing team, pitcher, or other predetermined condition may be predefined by the fantasy league commissioner prior to the query 322. If on any randomly selected offensive play the former player incurred an injury 324, no more virtual offensive plays will be taken on behalf of the former player for a time period equal to the time the former player was historically injured 326.

As each play is randomly selected 322, if no injury is attributed to the former athlete, the statistical categories associated with that offensive play are attributed to the former player's virtual box score 328. This process repeats from step 322 until all of the offensive plays have been selected 330. After all offensive plays in the sequence have been randomly selected and taken 330, the total statistics attributed to the box score are converted to fantasy points via the league scoring system 332 and posted to the appropriate fantasy team.

Still referring to FIG. 3 and returning to step 312, if it is determined that the former athlete is a pitcher 312, the next step in the algorithm is to randomly select the number of innings to be pitched in the fantasy game on behalf of the former athlete 340. The number of innings pitched will correspond to the number of innings the former athlete actually pitched in a randomly selected game from his career. The probability that the game selected featured a specific opposing team may be predefined by the fantasy league commissioner.

Once the number of innings to pitch is determined 340, the next step is to randomly select batters faced from a database containing statistics associated with every batter, or substantially every batter, the former athlete faced over the course of his career 342. As the documented statistics associated with any batter the pitcher faced during his career will always include either a walk, hit, strikeout, sacrifice, force-out, or error, the algorithm will continue to randomly select batters faced and post the correlating box scores 348 until the sum of the outcomes that include sacrifice, force-out, and strikeout is equal to the product of the number of innings to be pitched 340 and three (three outs per inning). The probability that a randomly selected batter faced will come from a game that featured a specific opposing team may be predefined by the fantasy league commissioner. If on any randomly selected batter faced the former player incurred an injury 344, no more batters will be faced on behalf of the former player for a time period equal to the time the former player was historically injured 346 or some variant thereof.

As each batter faced is randomly selected 342 and if no injuries are incurred, the statistical categories associated with each batter faced are attributed to the former player's virtual box score 348. This process repeats 350 from step 342 until all batters have been faced. After all the batters faced in the sequence have been randomly selected 342, the total statistics attributed to the box score 332 are converted to fantasy points via the league scoring system and posted to the appropriate fantasy team.

Additionally, in some embodiments, if the former athlete is a pitcher, a step in the algorithm will randomly select a game outcome from a database containing all, or substantially all, outcomes of every game the former athlete pitched over the course of his career 352. For instance, the game could be a win, loss, no-decision or save for the pitcher. The probability that the game selected featured a specific opposing team may be predefined by the fantasy league commissioner. After the outcome of the game has been randomly selected 352, the corresponding statistic is attributed to the box score 354 and converted to fantasy points via the league scoring system 332 and posted to the appropriate fantasy team.

Figure 4:
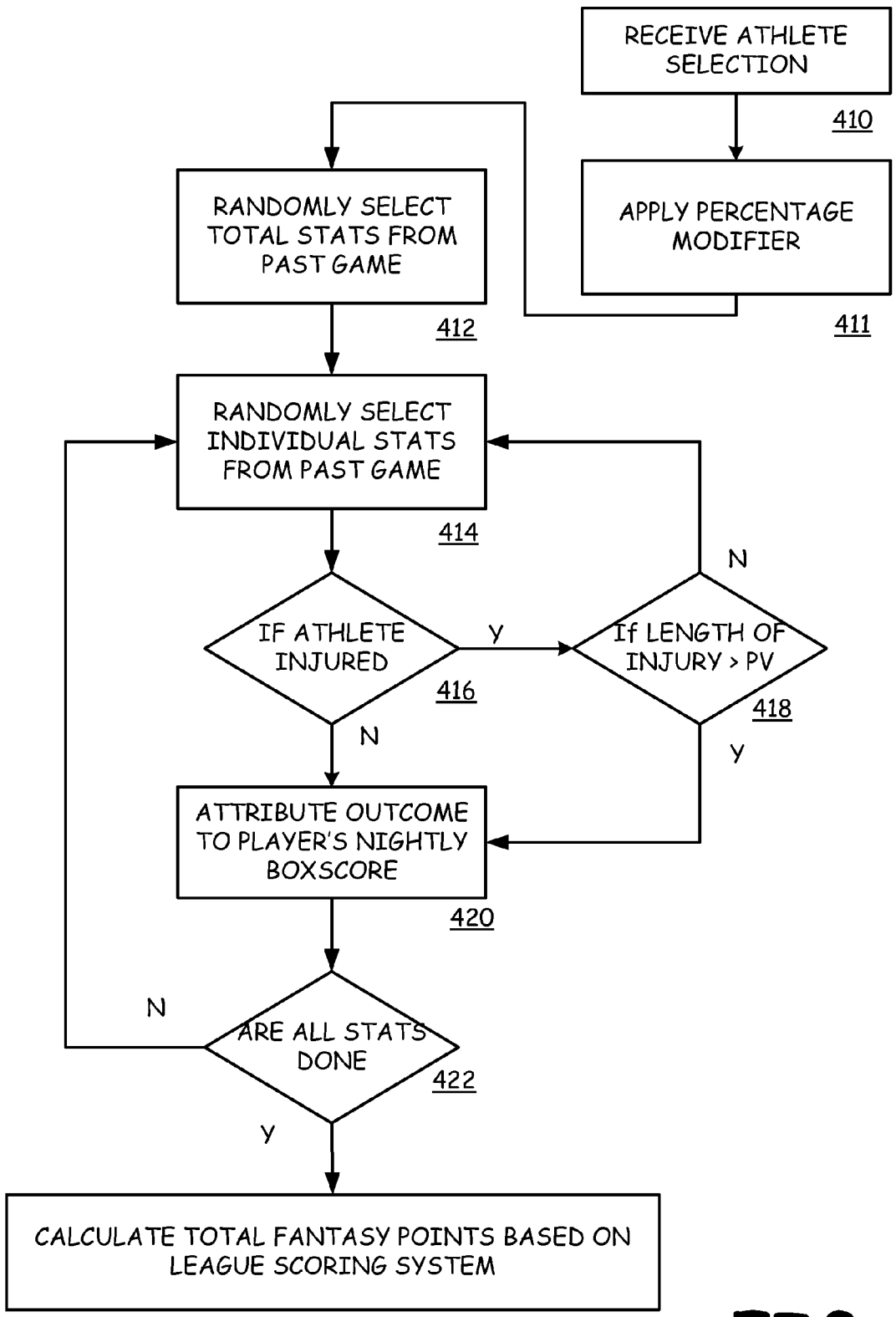
FIG. 4 is a flow diagram depicting a non-limiting example of the method in a fantasy basketball league for arriving at the specific plays that will be used to generate statistics for a given fantasy game on behalf of a former athlete.

FIG. 4 is a flow diagram depicting a non-limiting example of the method in a fantasy basketball league for arriving at the specific plays that will be used to generate statistics for a given fantasy game on behalf of a former athlete. Initially, the player is selected 410 and then based on this selection, the algorithm continues. A percentage modifier can be selected and or applied 411. The next step is to randomly select totals from games played over the course of the former athlete's career 412. Totals for categories including, but not limited to, shot attempts, free throw attempts, 3-point shooting attempts, and various combined totals are randomly selected from games in which the former athlete played. The probability that a total will be selected from a game featuring a specific opponent may be predefined by the fantasy league commissioner and/or the percentage modifier applied in step 411.

Once the totals are determined 412, the next step is to randomly select corresponding individual attempts from a database containing statistics associated with every play the former athlete ran over the course of his career 414. The probability that a randomly selected play will come from a game featuring a specific opponent may be predefined by the fantasy league commissioner. If on any randomly selected play the former player incurred an injury 416, no more virtual plays are run on the former player's behalf for a time period equal to the time the former player was historically injured 418.

As each play is randomly selected 414, and if an injury is not incurred, the statistical categories associated with that play are attributed to the former player's virtual box score 420. It should be noted that on the examples provided thus far, that even if an injury does occur, the statistics can be attributed to the virtual box score 424. This process is repeated 422 from step 414 until each play has been selected. After all plays in the sequence have been randomly selected and run 422, the total statistics attributed to the box score 420 are converted to fantasy points via the league scoring system 424 and posted to the appropriate fantasy team.

Thus, in the various embodiments of the present invention, performance from past or former athletes can be incorporated into a fantasy league event (such as a game, a series, a season, etc.) It will be appreciated that the present invention anticipates embodiments in which only former athletes participate in the fantasy league event. Yet in other embodiments the fantasy league event may include a blend of former athletes and currently active athletes. In yet another embodiment, the fantasy league even may include historical statistics of currently active players.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

In this application the invention has been described as being embodied as a system and/or a method. It should be appreciated that the present invention can be implemented in software embodied in a tangible readable medium, firmware operating within a computer system, hardware or any combination of these and other embodiments. The term "module" as used herein should not be implied to only describe a software module but rather, as a functional component that could be embodied in a software, firmware, hardware or a combination of any of these embodiments.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A system for selecting historical athletic performance statistics for use in a fantasy sports league contest, the system comprising the following elements:
   a computer readable medium comprising a database of historical athletic performance statistics, wherein each historical athletic performance statistic is associated with:
      one of a plurality of recorded games that are recorded in the database, wherein a recorded game is associated with a plurality of recorded plays and one or more former athletes who were listed on a roster prior to commencement of the recorded game;
      a recorded play within a particular recorded game, wherein the recorded play is associated with the one or more of said former athletes who were listed on the roster; and
      a former athlete; and
   a computer with a processor, wherein the processor is in communication with the computer readable medium and is configured to:
      receive selection of a selected former athlete;
      select a selected recorded game from the database, wherein the selected former athlete is associated with the selected recorded game by virtue of being one of the one or more former athletes who were listed on the roster associated with the selected recorded game;
      establish a participation value for the selected former athlete based on a quantity of recorded plays associated with both the selected recorded game and the selected former athlete; and
      if the participation value is greater than zero, select a quantity of selected historical athletic performance statistics associated with the selected former athlete from the plurality of recorded games that are recorded in the database, wherein the quantity of selected historical athletic performance statistics are associated with a quantity of selected recorded plays equal to the participation value.

2. The system of claim 1 wherein the processor is further configured to identify a portion of the selected former athlete's career and the selected recorded game is further associated with the identified portion.

3. The system of claim 1 further comprising a host server configured to render a front-end website for the purpose of tracking the fantasy league contest.

4. A method for selecting historical athletic performance statistics for use in a fantasy sports league contest, the method comprising the steps of:
   receiving, at a server configured to render the fantasy sports league contest, a selection a selected former athlete, wherein the server is in communication with one or more remote participant devices and the selection of the selected former athlete is the result of a participant using an actuator of a remote participant device;
   the server querying a database residing on a computer readable medium, wherein the database includes the historical athletic performance statistics that are each associated with:
      one of a plurality of recorded games that are recorded in the database, wherein a recorded game is associated with a plurality of recorded plays and one or more former athletes who were listed on a roster prior to commencement of the recorded game;
      a recorded play within a particular recorded game, wherein the recorded play is associated with the one or more of said former athletes who were listed on the roster: and
      a former athlete; and the server selecting a selected recorded game from the database, wherein the selected former athlete is associated with the selected recorded game by virtue of being one of the one or more former athletes who were listed on the roster associated with the selected recorded game;

the server assigning a participation value to the selected former athlete, wherein the participation value is based on a quantity of recorded plays associated with the selected recorded game and the selected former athlete;

if the participation value is greater than zero, the server selecting a quantity of selected historical athletic performance statistics associated with the selected former athlete from the plurality of recorded games that are recorded in the database, wherein the quantity of selected historical athletic performance statistics are associated with a quantity of selected recorded plays equal to the participation value.

5. The method of claim 4 further comprising the step of the server identifying a portion of the selected former athlete's career and the selected recorded game is further associated with the identified portion.

6. The method of claim 4, wherein the server ceases further selection of the quantity of the quantity of selected historical athletic performance statistics after selecting historical athletic performance statistic that indicates the selected former athlete sustained an injury.

7. The system of claim 1, wherein the quantity of selected historical athletic performance statistics are selected randomly.

8. The system of claim 2, wherein the quantity of recorded plays are associated with the selected recorded games comprised within the identified portion.

9. The system of claim 1, wherein:
the plurality of recorded games are further associated with environmental conditions; and
at least one selected historical athletic performance statistic is associated with one of the plurality recorded games that has an associated environmental condition similar to an environmental condition associated with the selected recorded game.

\* \* \* \* \*